United States Patent
Smits et al.

(10) Patent No.: US 6,903,166 B2
(45) Date of Patent: Jun. 7, 2005

(54) PROCESS FOR THE MANUFACTURE OF GLYCIDYLESTER COMPOSITIONS

(75) Inventors: Josef Jacobus Titus Smits, Amsterdam (NL); Edward John Marx, Montgomery, TX (US); Petrus Gerardus Kooijmans, Amsterdam (NL); Simon Ming Li, Houston, TX (US)

(73) Assignee: Resolution Performance Products LLC, Houston, TX (US)

( * ) Notice: Subject to any disclaimer, the term of this patent is extended or adjusted under 35 U.S.C. 154(b) by 0 days.

(21) Appl. No.: 10/840,115

(22) Filed: May 5, 2004

(65) Prior Publication Data

US 2004/0254333 A1 Dec. 16, 2004

Related U.S. Application Data

(62) Division of application No. 10/219,681, filed on Aug. 15, 2002, now Pat. No. 6,756,452, which is a division of application No. 09/645,729, filed on Aug. 24, 2000, now Pat. No. 6,451,929.
(60) Provisional application No. 60/162,375, filed on Oct. 29, 1999.

(51) Int. Cl.$^7$ .................... C08G 63/199; C08G 63/91; C08L 67/02
(52) U.S. Cl. .................. 525/437; 525/443; 525/444; 525/448; 528/297
(58) Field of Search .................. 525/443, 444, 525/448, 297, 437

(56) References Cited

U.S. PATENT DOCUMENTS 5,811,198 A 9/1998 Freriks et al. ............... 428/482

FOREIGN PATENT DOCUMENTS

| | | | |
|---|---|---|---|
| DE | 19548491 A1 | 6/1997 | |
| EP | 0447360 A2 | 3/1991 | ........... C08G/59/32 |
| EP | 0518408 A2 | 5/1992 | ........... C08G/59/12 |
| EP | 0634434 A2 | 7/1994 | ........... C08G/63/60 |
| EP | 0720997 A2 | 1/1996 | ........... C08G/63/60 |
| JP | 11071452 | 6/1999 | |
| WO | WO 96/11238 | 4/1996 | ........... C08L/63/00 |
| WO | WO 98/23661 | 6/1998 | ........... C08G/59/12 |
| WO | WO 98/24828 | 6/1998 | ........... C08G/59/12 |
| WO | WO 98/37119 | 8/1998 | |
| WO | WO 98/42768 | 10/1998 | ........... C08G/63/60 |

*Primary Examiner*—Robert Sellers

(57) ABSTRACT

A process for the manufacture of glycidylester compositions by (a) reacting: (i) at least one cyclohexyl anhydride compound A; (ii) at least one di-secondary or di-primary hydroxyl compound B containing two (cyclo)aliphatic hydroxyl groups; (iii), at least one di-secondary carboxylic acid or anhydride compound C; and (iv) a mono-glycidyl ester of an α,α-branched carboxylic acid compound D containing from 5 to 19 carbon atoms; and (b) reacting the carboxyl functional polyester from step (a) with an excess epihalohydrin in the presence of a base.

5 Claims, No Drawings

PROCESS FOR THE MANUFACTURE OF GLYCIDYLESTER COMPOSITIONS

RELATED APPLICATION DATA

The present is a Divisional of U.S. application Ser. No. 10/219,681, filed Aug. 15, 2002, issued as U.S. Pat. No. 6,756,452, which is a Divisional of U.S. application Ser. No. 09/645,729, filed Aug. 24, 2000, issued as U.S. Pat. No. 6,451,929, which claims benefit of U.S. Provisional Ser. No. 60/162,375, filed Oct. 29, 1999.

BACKGROUND OF THE INVENTION

The present invention relates to glycidylester compositions, to a process for their preparation, to coating compositions and other curable compositions comprising the glycidylester compositions, and to cured products obtained by using the indicated curable compositions.

Coating compositions based on the reaction products of 2,2-bis-(4-hydroxyphenyl)propane and epichlorohydrin are known. The cured products prepared on the basis of these compositions are resistant against hydrolysis, however, they show a low ultraviolet resistance and are therefore not suitable for applications requiring a high degree of outdoor durability such as building parts or automotive topcoats.

Triglycidylesters which can be used in outdoor durable coatings and in moulding compositions are disclosed in European Patent Application No. 447360A (EP-A-447,360). The application discloses the product having high levels of hydrolyzable chlorine content. In example 2 of EP-A-447, 360 which relates to the glycidation of the 2:1 adduct of hexahydrophthalic anhydride and dimethylolpropionic acid, the product obtained has a hydrolyzable chlorine content of 1.0% (10,000 mg/Kg). Such a high level of residual chlorine is generally undesirable in coating compositions.

European patent application No. 0518408A2, describes thermosetting resin compositions containing (i) an advanced resin product obtainable by reacting (a) a diglycidyl ester of an alpha,alpha'-dibranched dicarboxylic acid of the general formula I

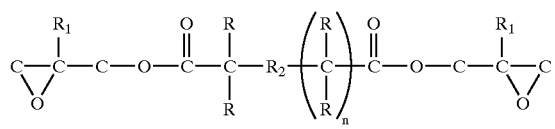

(I)

with (b) an alpha,alpha'-dibranched dicarboxylic acid of the general formula II

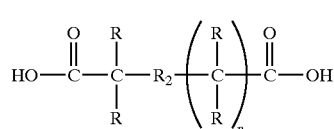

(II)

wherein n is 0 or 1, wherein R is independently selected from the group consisting of straight and branched chain alkyl, cycloalkyl, arylalkyl and aryl, or both R's may form part of a substituted or unsubstituted cycloaliphatic ring system comprising 5, 6 or 8 carbon atoms, in which case n should be 0, wherein $R_1$ is independently a hydrogen atom or a methyl group, wherein $R_2$ is a single bond, substituted or unsubstituted alkylene or arylene or a radical of the formula III

(III)

wherein $m_1$ and $m_2$ are independently 0 or 1, wherein $R_3$ is independently selected from the group consisting of substituted or unsubstituted alkylene, and X is a single bond or one of the following bridging groups 1 to V

(I)

(II)

(III)

(IV)

(V)

(VI)

wherein $R_4$ is independently selected from the group consisting of $C_1$ to $C_4$ alkyl, with the proviso that when X is bridging group (V), $m_1$ is 0 and when X is bridging group (VI), $m_2$ is 0 and when n is 0, $R_2$ is a single bond; and (ii) a curing compound selected from the group consisting of amino resins blocked or unblocked (cyclo)aliphatic isocyanates, alpha,alpha'-dibranched cyclic anhydrides, acid-functional polyesters containing only alpha,alpha'-dibranched acid and ester groups, (cyclo)aliphatic amines, (cyclo)aliphatic polyamino amides, blocked or unblocked Lewis acids, and teritary amines.

The molar ratio of compounds (a) and (b) was preferably in the range of from 0.5 to 2.0.

Preferred reactants (a) are selected from diglycidyl ester of diethyl malonic acid, 2,2,5,5-tetramethyl adipic acid, sulphodipivalic acid and tetrapropyl adipic acid and preferred reactants (b) are selected from diethylmalonic acid, 2,2,5,5-tetramethyl adipic acid, sulphopivalic acid and tetrapropyl adipic acid.

It will be appreciated from the European patent application and other publications, referred to therein, that only very specifically structured diglycidyl esters of alpha,alpha'-dibranched dicarboxylic acid could be used as reactant in coating compositions that show a combination of acceptable hydrolytic stability, resistance of transesterification and acceptable weathering resistance.

International Application WO 96/11238 shows that epoxy resins containing cycloaliphatic nuclei have the disadvantage that they could only provide brittle coating films when cured. This brittleness made them unsuitable for coating applications, as brittleness often led to poor adhesion.

European patent application No. 0634434 A2 describes a process for the preparation of linear tertiary aliphatic carboxyl functional polyester resins, by reacting: (a) at least one compound A' comprising one monofunctional primary- or secondary hydroxyl group and/or at least one compound A" comprising one primary- or secondary hydroxyl group and one tertiary aliphatic carboxyl group; (b) at least one aromatic or cycloaliphatic dicarboxylic acid compound B comprising two aromatic- or secondary aliphatic carboxyl groups or the anhydride thereof; (c) at least one diol compound C comprising two aliphatic hydroxyl groups, which may independently be a primary or a secondary hydroxyl group; and (d) at least one dihydroxymonocarboxylic acid compound D comprising a tertiary aliphatic carboxyl group and two aliphatic hydroxyl groups, which may each independently be primary or secondary hydroxyl, the molar ratio of compounds A':A":B:C:D being M:N:X+Y+1:X:Y wherein M+N=2, X ranges from 2 to 8 and Y ranges from 2−N to 8, at a temperature of from 100 to 240° C., until essentially all the non-tertiary carboxyl groups as initially present in the reaction mixture have been reacted. The linear tertiary aliphatic carboxyl functional polyesters were reacted with an excess epihalohydrin in the presence of a suitable base and optional catalyst to produce polyglycidylester resins.

The European patent application No. 0720997A2 describes certain linear tertiary carboxyl functional polyesters and epoxy functional polyester resins. These polyester resins were obtained by reaction of: a) at least one aromatic and/or cycloaliphatic carboxylic acid compound A comprising two aromatic- and/or secondary aliphatic carboxyl groups or the anhydride thereof, b) at least one hydroxyl compound B comprising two aliphatic hydroxyl groups, which groups each independently may be primary or secondary hydroxyl groups, c) at least one hydroxyl substituted carboxylic acid compound C comprising at least one tertiary aliphatic carboxyl group and two aliphatic hydroxyl groups, which groups each independently may be primary or secondary hydroxyl groups, and d) optionally one carboxylic acid compound D comprising one carboxyl group, the molar ratio of compounds A:B:C:D being (X+Y−1):X:Y:Z, wherein X ranges from 2 to 8, Y ranges from 2 to 8, and Z ranges from 0 to 2.

The International Patent Application WO 98/23661 describes linear, tertiary carboxyl functional polyester resins obtainable by reaction of a) at least one compound $A_1$, comprising the reaction product of (i) a glycidylester of a mixture of synthetic highly branched saturated monocarboxylic acids isomers of formula $(R_1)(R_2)(R_3)$—C—COOH wherein $R_1$, $R_2$ and $R_3$ are alkyl groups of from 1 to 15 carbon atoms, of which at least one is methyl, each acid containing from 5 to 19 and preferably from 5 to 13 carbon atoms, and (ii) a mixture of said synthetic highly branched saturated monocarboxylic acids, in a molar ratio of 1:1; said component $A_1$ being optionally mixed with hydroxy pivalic acid ($A_2$) and/or hydrogenated diphenylolpropane ($A_3$); b) at least one aromatic or cycloaliphatic dicarboxylic acid compound B, comprising two aromatic- or secondary aliphatic carboxyl groups or the anhydride thereof; optionally c) a dihydroxymono-carboxylic acid compound C comprising a tertiary aliphatic carboxyl group and two aliphatic hydroxyl groups, which may each independently be primary or secondary hydroxyl; and optionally (d) a diol compound D comprising two aliphatic hydroxyl groups which may each independently be a primary or a secondary hydroxyl group; the molar ratio of compounds $A_1:A_2+A_3:B:C:D$ being $A_1$: $(2-A_1):X+Y+1:X:Y$, wherein $A_1$ ranges from 0.1 to 2, wherein Y ranges from 0 to 6 and X ranges from 2 to 8, at a temperature of from 100 to 225° C., until essentially all the non-tertiary carboxyl groups as initially present in the reaction mixture have been reacted; polyglydicylesters derived from said polyester resins and coating compositions containing the polyester resin and/or the polyglycidyl resin.

The International Patent Application WO 98/24828 describes linear, tertiary carboxyl functional polyester resins obtained by reaction of (a) at least one 1,4-dicarboxylcyclohexane (A) optionally mixed with a minor weight fraction of an alkane dicarboxylic acid, containing in the range of from 8 to 16 carbon atoms (A'), (b) at least one dihydroxymonocarboxylic acid compound (B), comprising a tertiary aliphatic carboxyl group and two aliphatic hydroxyl groups, optionally (c) one diol compound (C) comprising two aliphatic hydroxyl groups, which may each independently be a primary or a secondary hydroxyl group, and optionally (d) a compound (D') comprising one monofunctional primary or secondary hydroxyl group and/or a compound (D") comprising one primary or secondary hydroxyl group and one tertiary aliphatic carboxyl group, the molar ratio of the compounds (A+A'):B:C:D':D" being X+Y+1:Y:X:M:N wherein M+N is the range of from 0 to 2, wherein X ranges from 2 to 8, and Y ranges from [2−(M+N)] to 8, at a temperature of from 100 to 225° C., until essentially all the non-tertiary carboxyl groups as initially present in the reaction mixture have been reacted; polyglycidylesters derived from said polyester resins; and coating compositions containing the polyester resin and/or the polyglycidylester resin.

International Application WO 98/42768 describes carboxyl functional polyester resins, epoxy functional polyester resins, derived from them, and coating compositions comprising these polyester compounds. The carboxyl functional polyester resins are obtained by reaction of: a) at least a compound of the formula:

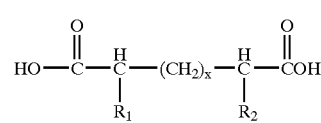

I wherein $x \geq 1$, $R_1$ and $R_2$ each may represent an alkyl group having from 1 to 4 carbon atoms or wherein $R_1$ and $R_2$ may form together with the group —CH—$(CH_2)_x$—CH— a cycloalkyl group and preferably 1,4-cyclohexane dicarboxylic acid (A1), optionally mixed with minor amounts of a corresponding compound of formula I, wherein x=0 or anhydride thereof (A2), b) at least one diol compound B comprising two aliphatic hydroxyl groups which may each independently be a primary or a secondary hydroxyl group; optionally c) a dihydroxymonocarboxylic acid compound C, comprising a tertiary aliphatic carboxyl group and two aliphatic hydroxyl groups, which may each independently be primary or secondary hydroxyl; and optionally d) a trihydroxyalkane (D1) or tetrahydroxyalkane (D2), the molar ratio of compounds $(A1+A_2):B:C:D1:D2$ being X+Y+2Z+3Q+P:X:Y:Z:Q, wherein X ranges from 1 to 8, Y ranges from 0 to 8, Z ranges from 0 to 4 and Q ranges from 0 to 3 and wherein p ranges from 1 to 5, and preferably 1–3 and is most preferably equal to 1, at a temperature of from 100 to 240° C., and preferably from 180 to 210° C. if any compound C is present, until essentially all the hydroxyl groups as initially present in the reaction mixture have been reacted.

Although the linear tertiary aliphatic carboxyl functional polyester resins and the polyglycidylesters provided a certain progress towards the requirements of outdoor durability (UV stability) and resistance against hydrolysis in the cured state, with reference to their use in modern economically applied coatings, there is still a need for further improvement of properties and/or decreased manufacturing costs.

It can be appreciated from the teachings of hereinbefore discussed EP 0634434A2, EP 0720997A2, WO 98/23661, WO 98/24828, WO 98/42768, that (i) in order to obtain improved cured coating properties, derived from a carboxyl functional polyester resin and an epoxy functional polyester resin, it could only be reached by either introducing terminal tertiary carboxyl groups in the polyester core block which are originating from a dicarboxylic acid reactant, wherein the carboxyl groups were removed from each other at least three methylene carbon atoms, or the original terminal carboxyl group in the initially prepared carboxyl functional polyester resin had to be reacted with a hydroxy branched alkane carboxylic acid, and that (ii) the presence of terminal carboxyl groups in the starting carboxyl functional polyester resin originating from a dicarboxylic acid or anhydride reactant, wherein the carboxyl groups are removed only two methylene carbon atoms such as phthalic acid or anhydride or 1,2-cyclohexanedicarboxylic acid or the anhydride thereof, should be avoided, as they could not be efficiently glycidated into the corresponding polyglycidyl polyesters.

SUMMARY OF THE INVENTION

Accordingly, the present invention provides glycidylester compositions produced by reacting a carboxyl functional polyester compound having an acid value of less than 280 mgKOH/gr with an excess epihalohydrin, in the presence of a suitable base and optionally a catalyst, wherein the carboxyl functional polyester resins are produced by reacting:

(a) at least one compound A, said compound A is an anhydride having the formula

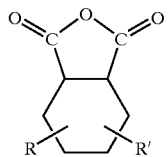

(I)

wherein R and R' each independently represents hydrogen or an alkyl group having from 1 to 4 carbon atoms connected to the cyclohexane ring or together may form a cyclohexane ring, or a diacid containing one secondary acid group and one tertiary acid group; at least one compound B, said compound B has an oxygen content of at most 35 wt % and contains two aliphatic or cycloaliphatic hydroxyl groups and is a di-secondary hydroxyl compound or a di-primary hydroxyl compound which does not contain beta hydrogen atoms and contains at least three carbon atoms between the two hydroxyl groups, or if C is present a monoepoxide D, said monoepoxide D is a mono-glycidyl ester of alpha-alpha-branched carboxylic acid containing from 5 to 19 carbon atoms; and optionally (c) at least one compound C, said compound C is a di-secondary carboxylic acid or anhydride, the molar ratio of the components A:B:C being 2:X:Y, wherein Y ranges from 0 to 3, wherein X is Y+1, at a temperature effective to react essentially all the hydroxyl groups as initially present and formed in the reaction mixture, said carboxyl functional polyester compound being substantially free of unreacted diacid monomers.

DETAILED DESCRIPTION OF THE INVENTION

As result of extensive research and experimentation it has now surprisingly been found that glycidylester composition of the invention containing certain terminal carboxyl groups, originating from a dicarboxylic acid or anhydride reactant, can be efficiently glycidated to provide glycidyl esters with a combination of a high epoxy group content (i.e. close to the theoretical value) and a low hydrolyzable halogen content, and more in particular chlorine content, which has been found to have negative effect on the resin, coating formulation, and cured film properties.

Several embodiments of the invention are described herein. Any of the elements of the invention may comprise any one or a combination of the features disclosed the several embodiments described herein.

As indicated hereinbefore, the invention relates to glycidylester composition, and curable compositions therefrom. Glycidylester composition is produced by glycidation of a carboxyl functional polyester compound which is produced by reacting components A and B and optionally C as hereinbefore specified.

Compound A can be an anhydride having the formula

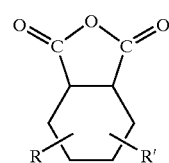

(I)

wherein R and R' each independently represents hydrogen or an alkyl group having from 1 to 4 carbon atoms connected to the cyclohexane ring or together may form a cyclohexane ring, or a diacid containing one secondary acid group and one tertiary acid group having an acid value between 200 and 2000 mg KOH/gram, preferably between 400 and 1500 and most preferably between 500 and 1000.

Components A can be, for example, anhydrides of acids such as 1,2-cyclohexanedicarboxylic acid (hexahydrophthalic acid), 5-methyl-1,2-cyclohexanedicarboxylic acid, 2,3-dimethyl-5-isobutyl-1,2-cyclohexane dicarboxylic acid, endomethylenetetrahydrophthalic acid, or 5-methylendomethylenetetrahydrophthalic acid; diacids such as 1-alkyl-1,4-cyclohexane-dicarboxylic acid, wherein the alkyl substituent contains from 1 to 4 carbon atoms and more preferably 1-methyl-1,4-cyclohexane dicarboxylic acid.

As preferred components A are used those anhydrides wherein R and R' each independently represents a hydrogen or a methyl group. Most preferred component A is hexahydrophthalic anhydride.

The component (b) can be compound B that has an oxygen content of at most 35%, preferably at most 30%, more preferably at most 20 wt % and contains two aliphatic or cycloaliphatic hydroxyl groups and is a di-secondary hydroxyl compound or a di-primary hydroxyl compound which does not contain beta hydrogen atoms and contains at least three carbon atoms between the two hydroxyl groups or if C is present a monoepoxide D. The monoepoxide D is a mono-glycidyl ester of alpha-alpha-branched carboxylic acid containing from 5 to 19 carbon atoms, preferably from 9 to 19 carbon atoms.

Suitable examples of compounds B and D include, neopentyl glycol, hydrogenated diphenylolpropane (HDPP). CARDURA E10 Monomer (alpha-alpha-branched carboxylic acid containing 10 carbon atoms; Cardura is a trade mark), hydrogenated 4,4'-dihydroxydiphenyl, 1,4-dihydroxycyclohexane, hydroxy pivalic acid neopentyl glycol ester, and 2-butyl-2-ethyl-1,3-propanediol or mixtures thereof; of which HDPP is particularly preferred.

It will be appreciated that more preferred compounds to be used as compound B will contain an oxygen content from 30 to 5 wt %.

Preferably the compound B is a di-secondary hydroxyl compound.

Compound C can be a di-secondary carboxylic acid or anhydride. Compound C can be any di-secondary carboxylic acid or anhydride that is not used as Component (a).

Typical examples of compounds C are 1,4-cyclohexanedicarboxylic acid, 2-methyl-1,4-cyclohexanedicarboxylic acid, 2,3-dimethyl-1,4-cyclohexanedicarboxylic acid, 2,5-dimethyl-1,4-cyclohexanedicarboxylic acid, of which 1,4-cyclohexanedicarboxylic acid is most preferred.

More preferred are glycidylester compositions, wherein Y ranges from 0 to 2 and more preferably has a value of 0 or 1 and most preferably has a value of 0.

It will be appreciated that the glycidylester compositions of the invention have shown attractive properties, such as outdoor durability or dispersibility of the product.

In order to obtain good properties in the products derived from the glycidylester composition of the invention, the hydrolyzable halogen content of the glycidylester composition is preferably at most 6000 mg/kg.

The glycidylester composition can be used with coreactants or curing agents providing a coreacted material or a curable composition.

The curable or coreactable compositions can be used therefor as outdoor durable coatings and in particular coatings for metal substrates, and as curable systems for the manufacture of technical constructions, derivable from resin impregnated webs, such as woven or non-woven glass, aramide or carbon fibre web or cloth, to be used outdoor, e.g. windmills, automotive vehicles, airplanes. Curable coating compositions can be applied in the form of powder coatings or liquid coatings, depending on the type and amounts of the respective components which form the polyester resin backbone.

It will be appreciated that another aspect of the present invention is formed by the glycidylester compositions, which are substantially free of the earlier accompanying significant proportion of side products, which were deteriorating the former final properties of curable compositions and more in particular the coating compositions to be applied on metal substrates, for outdoor use.

Accordingly, the invention also relates to a process for the manufacture of glycidylester compositions of the invention having a hydrolyzable chlorine content of at most 6000 mg/kg and an epoxy group content above 90% of the theoretical value, comprising:

(a) reacting (i) at least one compound A, said compound A is an anhydride having the formula

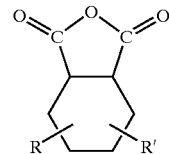

(I)

wherein R and R' each independently represents hydrogen or an alkyl group having from 1 to 4 carbon atoms connected to the cyclohexane ring or together may form a cyclohexane ring, or a diacid containing one secondary and one tertiary acid group;

(ii) at least one compound B, said compound B has an oxygen content of at most 35 wt % and contains two aliphatic or cycloaliphatic hydroxyl groups and is a di-secondary hydroxyl compound or a di-primary hydroxyl compound which does not contain beta hydrogen atoms and contains at least three carbon atoms between the two hydroxyl groups or if C is present a monoepoxide D described above; and optionally (iii) at least one compound C, said compound C is a di-secondary carboxylic acid or anhydride, at a molar ratio of the components A:B:C of 2:X:Y, wherein Y ranges from 0 to 3, wherein X is Y+1, at a temperature effective to react essentially all the hydroxyl groups as initially present and formed in the reaction mixture thereby producing a carboxyl functional polyester compound having an acid value of less than 280 mgKOH/gr, preferably in the range of 150 mgKOH/gr to 280 mgKOH/gr, and containing substantially no diacid monomers having acid value of greater than 280 mgKOH/gr; and (b) reacting said carboxyl functional polyester compound from step (a) with an excess epihalohydrin in the presence of a suitable base and optionally a catalyst, at a temperature effective to react essentially all the carboxylic acid groups as initially present in the reaction mixture thereby producing the glycidylester composition.

The reaction in step (a) is preferably carried out at a temperature in the range of 100 to 200° C., more preferably in the range of 120 to 175° C., for a time effective to react essentially all the hydroxyl groups as initially present in the reaction mixture. The remaining amount of hydroxyl groups is preferably less than 5%, more preferably less than 2% of the hydroxyl groups initially present, most preferably all of the initially present hydroxyl groups have been reacted. The reaction in step (b) is preferably carried out at a temperature in the range of 20 to 125° C., more preferably 40 to 100° C. for a time effective to react essentially all the carboxylic acid groups as initially present in the reaction mixture.

The remaining amount of carboxylic acid groups is preferably less than 5%, more preferably less than 2% of the carboxylic acid groups initially present, most preferably all of the initially present carboxylic acid groups have been reacted. The hydroxyl groups and carboxylic acid groups can be monitored by any conventional methods including infrared spectroscopy, NMR spectroscopy or titration.

The polyester product produced in step (a) contain substantially no diacid monomers having acid value of greater than 280 mgKOH/gr. Diacid monomers include starting diacid components A and/or C and diacids derived from the starting anhydride components A and/or C. The carboxyl functional polyester product of step (a) contain preferably less than 5%, more preferably less than 2%, more preferably no detectable amount of diacid monomers.

These low molecular weight diacid components are undesirable in the final products.

The curable or coreactable coating compositions of the invention may be prepared by addition of a curing agent (cross-linking resin) or a coreactant to the hereinbefore specified glycidylester composition.

The amount of curing agent or coreactant used in the coating compositions of the invention will normally be such so as to provide about equal amounts of reactive groups of the curing agent or coreactant and of the epoxy groups present in the glcidylpolyester composition.

It will be appreciated that said coating compositions can be successfully applied by immersion, spraying, brushing, roller coating or any other appropriate technique.

Suitable curing agent or coreactant for use in combination with the polyglycidylester resins of the present invention are for example the (corresponding) acid functional polyester composition of the present invention; solid polyacids such as sebacic acid 1,12-dodecanedioic acid; anhydrides such as polyazeleic polyanhydride; acid functional polyesters such as the reaction product of one mole of trimethylolpropane and 3 moles of hexahydrophthalic anhydride, the reaction product of 1,6-hexanediol with a molar excess of 1,12-dodecanedioic acid, the reaction product of 4 moles 1,10-decanedicarboxylic acid, 1.49 mols hexanediol, 0.47 mols 1,1,1-tris-(hydroxymethyl)-propane and 0.27 mols pentaerythritol, the reaction product of 4 moles 1,10-decanedicarboxylic acid, 1.2 mols hexanediol, 0.45 mols trimethylolpropane, 0.29 mols pentaerythritol and 0.21 mols dimethylolpropionic acid and the reaction product of one mole of hexamethoxymethylmelamine and 3 moles of hydroxypivalic acid and amine-type curing agents.

Most preferred are combinations of the glycidylester compositions and the polyester compound that the glycidylester is derived from.

The coating compositions of the present invention may further comprise a catalyst and optionally other additives, as known in the art to be suitable for use in coating compositions.

Suitable catalysts are for example quaternary ammonium and phosphonium salts; metal salts/compounds such as for example stannous(II)octoate; basic compounds such as for example the imidazoles; and tertiary amines such as for example diazabicyclo/undecene.

The amount of catalyst used will usually be somewhere in the range of from 0.1 to 2% by weight based on the weight of the total coating composition.

Suitable cure or reaction times for reacting the epoxy groups and the reactive group of the curing agent or coreactant and temperatures of the coating compositions of the invention are those conventionally applied in connection with coating systems.

The invention is illustrated by the following examples, however without restricting its scope to these specific embodiments.

EXAMPLES

Example 1

Preparation of linear aliphatic carboxyl functional polyester 1 to 6 according to the invention and comparative linear aliphatic functional polyesters a, b, c, d and e.

The respective components of each polyester resin were charged in molar amounts as indicated in Table 1 in a round-bottom glass reactor, equipped with reflux condenser, temperature control, nitrogen inlet and stirrer.

The mixture was then heated to 150° C. in 30 minutes. The temperature of the reaction mixture was increased in 30 minutes to 170° C. and kept at 170° C. until the theoretical acid value as referred to above was reached. The acid functional polyester thus formed was discharged and allowed to cool down to room temperature.

TABLE 1

| Linear acid functional polyester resin | 1 | 2 | 3 | 4 | 5 | 6 | A | b | c | d | E* |
|---|---|---|---|---|---|---|---|---|---|---|---|
| HHPA  | — | 2 | — | 2 | 2 | 2 | — | — | — | 2 | 2 |
| mHHPA | 2 | — | 2 | — | — | — | — | — | — | — | — |
| HDPP  | 1 | 1 | — | — | — | — | — | — | — | — | — |
| BEPD  | — | — | 1 | 1 | — | — | — | — | — | — | — |
| NPG   | — | — | — | — | 1 | — | — | — | — | — | — |
| HD    | — | — | — | — | — | 1 | — | — | — | — | — |
| HPA   | — | — | — | — | — | — | 2 | 2 | 2 | — | — |
| 1,4   | — | — | — | — | — | — | 2 | 2 | 1 | — | — |
| CE-10 | — | — | — | — | — | — | 1 | — | — | — | — |
| HDPP  | — | — | — | — | — | — | — | 1 | — | — | — |
| EG    | — | — | — | — | — | — | — | — | — | 1 | — |
| DMPA  | — | — | — | — | — | — | — | — | — | — | 1 |

*polyester resin prepared according to EP-0447360A2
HHPA: hexahydrophthalic anhydride
mHHPA: 5-methyl-1,2-cyclohexanedicarboxylic anhydride
HDPP: hydrogenated diphenylolpropane
BEPD: 2,2-butyl-ethyl-1,3-propanediol
NPG: neopentyl glycol
HD: 1,6-hexanediol
HPA: hydroxypivalic acid
1,4: 1,4-cyclohexanedicarboxy acid
CE-10: CARDURA E10 glycidylester (CARDURA is a trademark)
EG: ethylene glycol
DMPA: dimethylolpropionic acid

Example 2

Preparation of polyglycidylester resin I to VI according to the invention and comparative polyglycidylester resin (formed from HHPA only).

An amount equalling 1 carboxyl group equivalent of a functional polyester resin 1 to 6 and of comparative polyfunctional polyester resin a–e, as prepared in example 1 and HHPA only was dissolved in 8 moles epichlorohydrin (ECH) and 7.68 moles of isopropylalcohol (IPA)and 7.68 moles of water. The solution was charged to a 3 litre glass reactor equipped with a temperature control, stirrer and reflux condenser. Next, the temperature was raised to 75–85° C., followed by the first gradual addition of an aqueous solution of 0.17 moles NaOH over a period of time of 20 minutes. After an additional reaction period of 50 minutes the reactor content was cooled to 55° C. in 30 minutes, followed by the second gradual addition of an aqueous solution of 0.94 moles NaOH over a period of time of 60 minutes. After an additional reaction period of 5 minutes the reactor content was allowed to settle and the aqueous phase was separated from the organic phase.

The organic phase was vacuum flashed to remove the water, IPA and ECH.

The resulting product was dissolved in methyl-isobutylketone and the organic phase was washed four times with water whereafter the organic phase was vacuum flashed to remove methyl-isobutylketone. The glycidylester thus obtained was discharged and allowed to cool down. Characteristics of the polyglycidylester resins prepared are presented in Table 2.

Hydrolyzable chlorine (without correction for the possible presence of inorganic chlorine) was determined by the following method:

A weighed amount of test sample was dissloved in 15 mL toluene and 50 mL methyl ethyl ketone and, if the sample was a solid resin, in 50 mL tetrahydrofuran (THF). Subsequently, 50 mL of a solution of KOH in methanol (0.1 mol/L) was added, and the mixture was refluxed for 30 minutes. After addition of 1 mL acetic acid, the chlorine content in the sample was determined by potentiometric titration with standard silver nitrate solution and the hydorlyzable chlorine content of the sample is calculated from the data obtained.

Example 3

Preparation of Polyglycidylester Resin VII According to the Invention and Comparative Polyglycidylester Resin An amount equalling 0.34 carboxyl group equivalent of a 50:50 eq/eq blend of two linear tertiary aliphatic carboxyl functional polyester resins 1 and 3 were dissolved in 3.4 moles epichlorohydrin (ECH) and isopropylalcohol (IPA) and water at a ratio of ECH, IPA and water of 60:30:10 by weight. The solution was charged to a 1 litre glass pressure reactor equipped with temperature control and stirrer. Controlling the temperature to 78–83° C., the first gradual addition of a 20% wt aqueous solution of 0.09 moles NaOH was pressured into the reaction vessel over a period of time of 12 minutes, and an additional reaction period of 8 minutes. While controlling the temperature to 83–88° C., the second gradual addition of a 20% wt aqueous solution of 0.27 moles NaOH was pressured into the reaction vessel over a period of time of 15 minutes, and an additional reaction period of 4 minutes. The reactor content was cooled to 52° C. in 10 minutes, and the third addition of an aqueous solution of 0.07 moles NaOH was pressured into the reaction vessel over a period of time of 1 minute, followed by an additional reaction period of 4 minutes. Finally, the last addition of an aqueous solution of 0.023 moles NaOH was pressured into the reaction vessel over a period of time of 1 minute, followed by an additional reaction period of 4 minutes. The reactor content was allowed to settle and the aqueous phase was separated from the organic phase.

The organic phase was washed three times with water where after the organic phase was vacuum flashed to remove epicholorohydrin and other volatiles. The glycidylester thus obtained was discharged and allowed to cool down. Characteristics of the polyglycidylester resins prepared are presented in Table 2.

Hydrolyzable chlorine (without correction for the possible presence of inorganic chlorine) was determined similarly as in example 2.

glass reactor equipped with a temperature control, stirrer and reflux condenser. Next, the temperature was raised to 75–85° C., followed by the first gradual addition of an aqueous solution of 0.195 moles NaOH over a period of time of 20 minutes. After an additional reaction period of 50 minutes the reactor content was cooled to 55° C. in 30 minutes, followed by the second gradual addition of an aqueous solution of 1.105 moles NaOH over a period of time of 60 minutes. After an additional reaction period of 5 minutes the reactor content was allowed to settle and the aqueous phase was separated from the organic phase.

The organic phase was vacuum flashed to remove the water, IPA and ECH. The resulting product was dissolved in methyl-isobutylketone and the organic phase was washed four times with water whereafter the organic phase was vacuum flashed to remove methyl-isobutylketone. The glycidylester thus obtained was discharged and allowed to cool down.

The epoxy group content of the obtained resins was respectively 2908 and 2834 mmol/kg. The hydrolyzable chlorine content was respectively 0.13% and 0.14%.

We claim:

1. A process for the manufacture of glycidylester compositions having a hydrolyzable chlorine content of at most 6000 mg/kg, and an epoxy group content above 90% of the theoretical value comprising the steps of:

(a) reacting (i) at least one compound A, comprising an anhydride having the formula

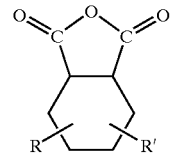

wherein R and R' each independently represents hydrogen or an alkyl group having from 1 to 4 carbon atoms connected to the cyclohexane ring or together forms a cyclohexane ring, or a diacid containing one secondary and one tertiary acid group;

(ii) at least one compound B comprising a di-primary or di-secondary hydroxyl compound containing two aliphatic or cycloaliphatic hydroxyl groups and at least three carbon atoms between the two hydroxyl groups, wherein the oxygen content is at most 35 wt % and there are no beta-hydrogen atoms;

TABLE 2

| Resin Characteristics Acid-functional polyester resin Acid value(mg KOH/gr) | 1 | 2 | 3 | 4 | 5 | 6 | 7 | a | b | c | d | e | f* |
|---|---|---|---|---|---|---|---|---|---|---|---|---|---|
| Found | 196.4 | 197.5 | 230.6 | 243.5 | 276 | 277.1 | 211.2 | 136.3 | 151.5 | 303.5 | 310.8 | 376.4 | 650.7 |
| Theoretical | 191.3 | 200.8 | 226 | 239.6 | 272 | 263.1 | 196.1 | | | | | | |
| Polyglycidylester resin | I | II | III | IV | V | VI | VII | A | B | C | D | E | F |
| EGC[mmol/kg] | 2684 | 2675 | 3170 | 3286 | 3582 | 3448 | 3001 | 1879 | 1915 | 3573 | 3837 | 4140 | 5626 |
| Hydrolyzable Chlorine content[% w] | 0.54% | 0.50% | 0.46% | 0.26% | 0.50% | 0.64% | 0.15% | 0.76% | 1.09% | 1.19% | 0.67% | 1.00% | 2.10% |

*pure HHPA

Example 4

Polyester 1 or 2 were dissolved in 8 moles epichlorohydrin (ECH) and 7.68 moles of isopropylalcohol (IPA)and 7.68 moles of water. The solution was charged to a 3 litre (iii) at least one compound C, comprising a di-secondary carboxylic acid or anhydride; and (iv) a monoepoxide D, wherein monoepoxide D is a mono-glycidyl ester of an alpha-alpha-branched carboxylic acid containing from 5 to 19 carbon atoms;

at a molar ratio of the components A:B:C of 2:X:Y, and Y ranges from greater than 0 to 3, wherein X is Y+1, at a temperature effective to react essentially all the hydroxyl groups as initially present and formed in the reaction mixture, thereby producing a carboxyl functional polyester having an acid value of less than 280 mgKOH/gram of polyester and containing substantially no diacid monomers having acid value of greater than 280 mgKOH/gram of polyester; and (b) reacting said carboxyl functional polyester from step (a) with an excess of epihalohydrin in the presence of a base and optionally a catalyst, at a temperature effective to react essentially all the carboxylic acid groups initially present in the reaction mixture, thereby producing the glycidylester composition.

2. The process of claim 1 wherein the carboxyl functional polyester has an acid value in the range of 150 mgKOH/gram of polyester to 280 mgKOH/gram of polyester.

3. The process of claim 1 wherein compound B is hydrogenated diphenololpropane.

4. The process of claim 1 wherein the reaction in step (a) is carried out at a temperature in the range of 100 to 200° C.

5. The process of claim 1 wherein the reaction in step (b) is carried out at a temperature in the range of 20 to 125° C.

* * * * *